United States Patent [19]

Ohgoshi

[11] 4,381,867
[45] May 3, 1983

[54] AUTOMATICALLY POSITIONABLE MECHANICAL SHAFT SEAL

[75] Inventor: Yoshiaki Ohgoshi, Minoh, Japan

[73] Assignee: Nippon Pillar Packing Co., Ltd., Osaka, Japan

[21] Appl. No.: 357,211

[22] Filed: Mar. 11, 1982

[30] Foreign Application Priority Data

Jan. 7, 1982 [JP] Japan .................................. 57-2022

[51] Int. Cl.³ .......................... F16J 15/38; F16J 15/48
[52] U.S. Cl. ........................................ 277/3; 277/27;
277/82; 277/85; 277/91; 277/93 SD
[58] Field of Search .............. 277/3, 27, 65, 82, 93 R,
277/93 SD, 85–87, 91, 94

[56] References Cited

U.S. PATENT DOCUMENTS

| | | |
|---|---|---|
| 2,122,378 | 6/1938 | McCormack .......................... 277/88 |
| 2,354,478 | 7/1944 | Reinhardt et al. ...................... 286/11 |
| 2,949,321 | 8/1960 | Tracy ...................................... 286/9 |
| 3,035,841 | 5/1962 | Riester .................................... 277/3 |
| 3,090,627 | 5/1963 | Tankus .................................. 277/91 X |
| 3,109,659 | 11/1963 | Gits et al. ............................ 277/91 X |
| 3,180,648 | 4/1965 | Kupfert et al. ........................ 277/92 |
| 3,201,135 | 8/1965 | Hayatian ................................ 277/92 |
| 3,339,930 | 9/1967 | Tracy ...................................... 277/27 |
| 3,392,984 | 7/1968 | Reinsma et al. ....................... 277/92 |
| 3,767,212 | 10/1973 | Ludwig ................................. 277/25 |
| 3,810,637 | 5/1974 | Bonvin ................................. 277/96.2 |
| 3,926,442 | 12/1975 | Muller .................................. 277/91 X |
| 4,087,100 | 5/1978 | Yoshihashi et al. ................... 277/92 |
| 4,104,169 | 8/1978 | Muller et al. ......................... 210/331 |
| 4,118,040 | 10/1978 | Christ et al. ........................... 277/75 |
| 4,335,888 | 6/1982 | Ohba et al. ........................... 277/96.1 |

FOREIGN PATENT DOCUMENTS 1155644 10/1963 Fed. Rep. of Germany ..... 277/96.1

Primary Examiner—Robert S. Ward, Jr.
Attorney, Agent, or Firm—Steele, Gould & Fried

[57] ABSTRACT

A mechanical seal made in a unit construction in which a seal unit case is fitted into and held by the inner periphery of a seal housing in a non-rotatable but axially slidable manner, the seal housing houses a rotary ring disposed on a rotary shaft in a non-rotatable but axially slidable manner, and a stationary ring in contact with the rotary ring at the sealing end surfaces thereof is securely fixed to the seal housing. The mechanical seal can be automatically moved to a position where a first fluid and a second fluid are balanced in pressure in response to a difference in pressure between these two fluids.

11 Claims, 4 Drawing Figures

AUTOMATICALLY POSITIONABLE MECHANICAL SHAFT SEAL

BACKGROUND OF THE INVENTION

The present invention relates to a mechanical seal to be suitably used, for example, in the shaft sealing portion of a turbodrill for intercepting muddy water in the turbine side and oil in the lubricating chamber side.

In a mechanical seal for intercepting a first fluid or muddy water and a second fluid or oil, it is a matter of course to avoid the use of such a mechanical seal wherever possible under conditions where there occurs a big difference in pressure between these two fluids, in view of the strength requirements of the mechanical seal. In other words, it is ideal to dispose such a mechanical seal at a position where these fluids are balanced in pressure. However, since a conventional mechanical seal is fixed at a permanent position, such a seal is generally subjected to conditions where there occurs a difference in pressure between two fluids due to change in pressure of the fluids. The case where the pressures of the fluids are constant is an exception which hardly occurs as a matter of fact.

Therefore, such a conventional mechanical seal has to be designed to be stronger than otherwise necessary when the severe operating conditions are into account. Even then, there is still a possibility that such a conventional seal will operate in an unstable manner if the difference in pressure between the fluids undergoes a change.

OBJECT OF THE INVENTION

It is an object of the present invention to provide a mechanical seal in a unit construction capable of being automatically movable to a position where a first fluid and a second fluid are balanced in pressure.

It is another object of the present invention to provide a mechanical seal which remains effective under any operating conditions, even though it has been designed based on the advantageous conditions where a first fluid and a second fluid are balanced in pressure; in other words, a mechanical seal of which designing conditions are relaxed as much as possible.

It is a further object of the present invention to provide a mechanical seal capable of performing a stable sealing function in a state where first and second fluids are balanced in pressure, even at the shaft sealing portion of a turbodrill where both of the fluids easily undergo a change in pressure.

BRIEF DESCRIPTION OF THE DRAWINGS

The description will be further discussed, by way of example, with reference to the accompanying drawings, in which.

DESCRIPTION OF THE PREFERRED EMBODIMENTS

Figure 1:
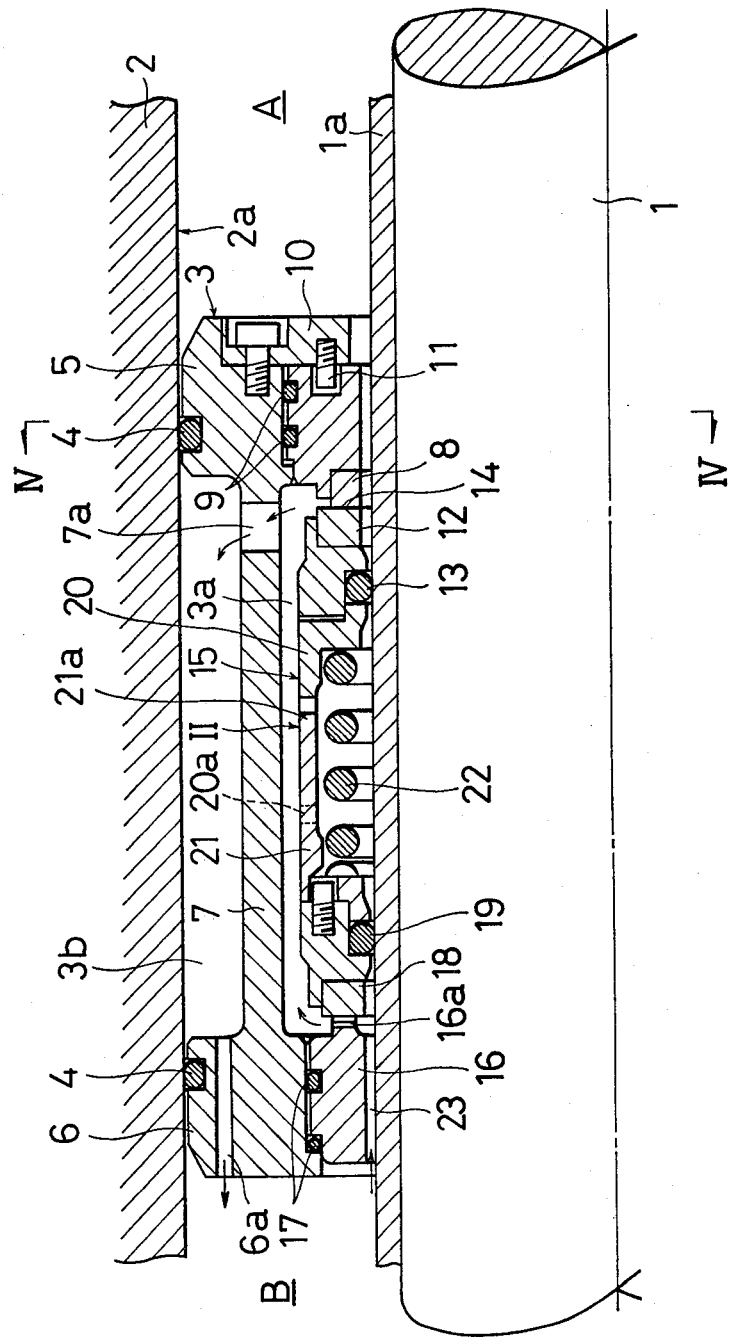
FIG. 1 is a section view of the upper half of a first embodiment of mechanical seal in accordance with the present invention.

FIG. 1 illustrates the shaft sealing portion of a turbodrill to which the present invention is applied. In this shaft sealing portion, a mechanical seal in accordance with the present invention intercepts a first fluid or muddy water in the turbine side A and a second fluid or oil in the lubricating chamber side B.

In the shaft sealing portion, there is disposed a cylindrical seal housing 2 for concentrically enclosing a rotary shaft 1 provided with a sleeve 1a. A mechanical seal is disposed in a cylindrical space between the rotary shaft 1 and the circular inner periphery 2a of the seal housing 2.

The following is a detailed description of the mechanical seal.

A seal unit case 3 is disposed on the rotary shaft 1 with a gap provided therebetween, and is fittingly held by the inner periphery 2a of the seal housing 2. The seal unit case 3 and the seal housing 2 are relatively axially slidable, but are not relatively rotatable. The seal unit case 3 has front and real walls 5 and 6, and a cylindrical portion 7 for connecting these walls 5 and 6 to each other. The front and rear walls 5 and 6 are fitted in airtight fashion to the inner periphery 2a by O-rings 4 in the non-rotatable but axially slidable manner.

The outer peripheries of the front and rear walls 5 and 6 are formed in an identical circular shape. A stationary ring 8 and a fixed ring 16 to be discussed later are respectively secured to the front and rear walls 5 and 6. Thus, the seal unit case 3 is arranged such that, on the surfaces of the seal unit case 3 at right angles to the axis of the rotary shaft 1, the area of receiving the pressure of muddy water in the turbine side A is equal to the area of receiving the pressure of oil in the lubricating chamber side B.

Accordingly, when there occurs a difference in pressure between a first fluid or muddy water and a second fluid or oil, for example, when oil in the lubricating chamber side B leaks outside, the seal unit case 3 is adapted to be axially displaced by this pressure difference to a position where the fluids are balanced in pressure.

The stationary ring 8 is put on the rotary shaft 1 with a gap provided therebetween, and is secured to the front wall 5 of the seal unit case 3 through O-rings 9, a flange 10 and a pin 11.

A rotary ring 12 opposite to the stationary ring 8 is disposed in a first space 3a between the rotary shaft 1 and the cylindrical portion 7 of the seal unit case 3. The rotary ring 12 is put on the rotary shaft 1 through an O-ring 13 in a non-rotatable but axially slidable manner.

Disposed between the seal unit case 3 and the rotary ring 12 is a spring-load retaining mechanism 15 for applying spring-load to the rotary ring 12 to maintain contact between the sealing end surfaces 14 of the stationary ring 8 and the rotary ring 12, regardless of rotation of the rotary ring 12 and axial displacement of the seal unit case 3.

As shown in FIG. 1, the spring-load retaining mechanism 15 comprises a fixed ring 16 which is put on the rotary shaft 1 with a gap provided therebetween and is secured to the rear wall 6 of the seal unit case 3 through O-rings 17, a movable ring 18 having a shape similar to that of the rotary ring 12 which is disposed in the first space 3a oppositely to the fixed ring 16 and is put on the rotary shaft 1 through an O-ring 19 in a non-rotatable but axially slidable, manner. First and second identical cylindrical spring retainers 20 and are connected to the rotary ring 12 and the movable ring 18, respectively. A spring 22 is disposed on the rotary shaft 1 in the spring retainers 20 and 21.

Figure 2:
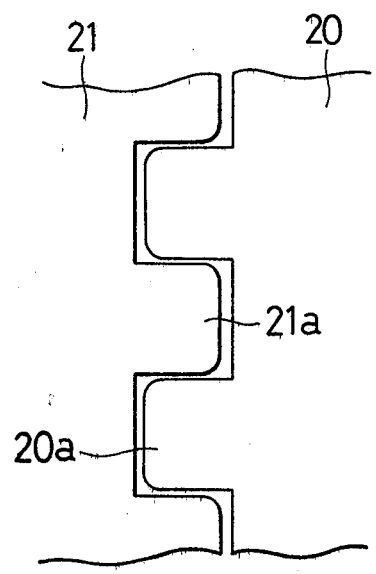
FIG. 2 is a plan view illustrating the portion II in FIG. 1 in a developed manner.

As shown in FIG. 2, the abutting ends 20a and 21a of the spring retainers 20 and 21 are formed in a comb shape to be engaged with each other so as to permit the spring retainers 20 and 21 to be axially displaced within a predetermined range.

The rotary ring 12 and the movable ring 18 (as well as the spring retainers 20 and 21 and the spring 22) can be rotated integrally with the rotary shaft 1 and axially slided on the rotary shaft 1. The rotary ring 12 and the movable ring 18 are spring-loaded by the spring 22 in the direction to keep them away from each other. The movable ring 18 comes in contact with the fixed ring 16 secured to the seal unit case 3 in a relatively rotatable manner. With such arrangement, the spring-load retaining mechanism 15 permits the rotary ring 12 to come in contact with the stationary ring 8 at the sealing end surfaces 14 thereof at all times, regardless of rotation of the rotary ring 12 and axial displacement of the seal unit case 3. Thus, the muddy water and oil are intercepted by the rotary contact of the rotary ring 12 with the stationary ring 8 at the sealing end surfaces 14 thereof.

The fixed ring 16 has therein a communicating hole 16a communicating with the first space 3a and a gap 23 between the fixed ring 16 and the rotary shaft 1. The cylindrical portion 7 of the seal unit case 3 has therein a communicating hole 7a which is located at a position opposite to the sealing end surfaces 14 and communicates with the first space 3a and a second space 3b between the cylindrical portion 7 and the inner periphery 2a of the seal housing 2. The rear wall 6 of the seal unit case 3 has therein a communicating hole 6a communicating with the second space 3b and the lubricating chamber side B. With such arrangement, oil in the lubricating chamber side B flows into the seal unit case 3. Since the oil in the first space 3a is forcibly sent through the communicating hole 7a into the second space 3b, oil in the lubricating chamber side B is circulated from the lubricating chamber side B to the lubricating chamber side B through the gap 23, the communicating hole 16a, the first space 3a, the communicating hole 7a, the second space 3b and the communicating hole 6a in succession. In such oil circulation, lubrication is made to the respective contact portions and cooling is also performed on the portions, such as the sealing end surfaces 14, where frictional heat is generated.

Thus, by the seal unit case 3, the whole mechanical seal is made in an axially slidable unit construction. Moreover, the area of receiving the pressure of muddy water in the turbine side A is made equal to the area of receiving the pressure of oil in the lubricating chamber side B. Therefore, if there occurs a difference in pressure of the fluids in the both sides A and B with respect to the mechanical seal, due to, for example, a leak of oil in the lubricating chamber side B, the whole mechanical seal in a unit construction is automatically moved to and maintained at a position where the both fluids are balanced in pressure.

Thus, the mechanical seal of the present invention can perform a sealing function all the time under conditions where the both fluids are balanced in pressure, regardless of change in pressure of the fluid in the turbine side A or the lubricating chamber side B.

It is therefore not at all required to design a mechanical seal taking into account severe operating conditions where there occurs a difference in pressure between the fluids. The designing conditions of the mechanical seal can be therefore relaxed to advantageously facilitate the designing and manufacture of the mechanical seal to a great extent.

Even if the mechanical seal encounters operating conditions where a pressure difference between the fluids undergoes a change, upon respective change in pressure the mechanical seal is moved to a position where the pressures of the fluids are equally experienced. Thus, a sealing function is performed under conditions where the fluids are balanced in pressure, whereby such sealing operation is stabilized.

In a turbodrill, even if the rotary shaft 1 is axially moved, the mechanical seal in a unit construction can be axially moved relatively with respect to the rotary shaft 1 and maintained by the pressures of the both fluids at a position where the both fluids are balanced in pressure, regardless of such movement of the rotary shaft 1.

A turbodrill or a vertical-typed machine such as a submarine pump, may be constructed with the lubricating chamber for lubricating bearings located under the shaft sealing means; namely, the lubricating chamber side B incorporating the bearings (not shown) is located under the seal unit. In such a case, if the lubricating oil leaks outside the machine, air tends to be accumulated around the shaft sealing means. Therefore, the shaft sealing means is operated without lubricating oil, thereby extremely reducing the life-time of the shaft sealing means. However, according to the mechanical seal of the present invention, the seal unit can be axially moved all the time to completely prevent the seal unit from being operated without lubricating oil, thereby to assure safe operation.

It is necessary to hold the seal unit case 3 in a non-rotatable manner by the inner periphery 2a of the seal housing 2. In the embodiment above-mentioned, such holding is made with the use of a frictional force of the O-rings 4. As discussed in the following, however, provision can be made to securely prevent the seal unit case 3 from being rotated, even if a frictional force of the O-rings 4 is lowered due to heat or the like.

Figure 3:
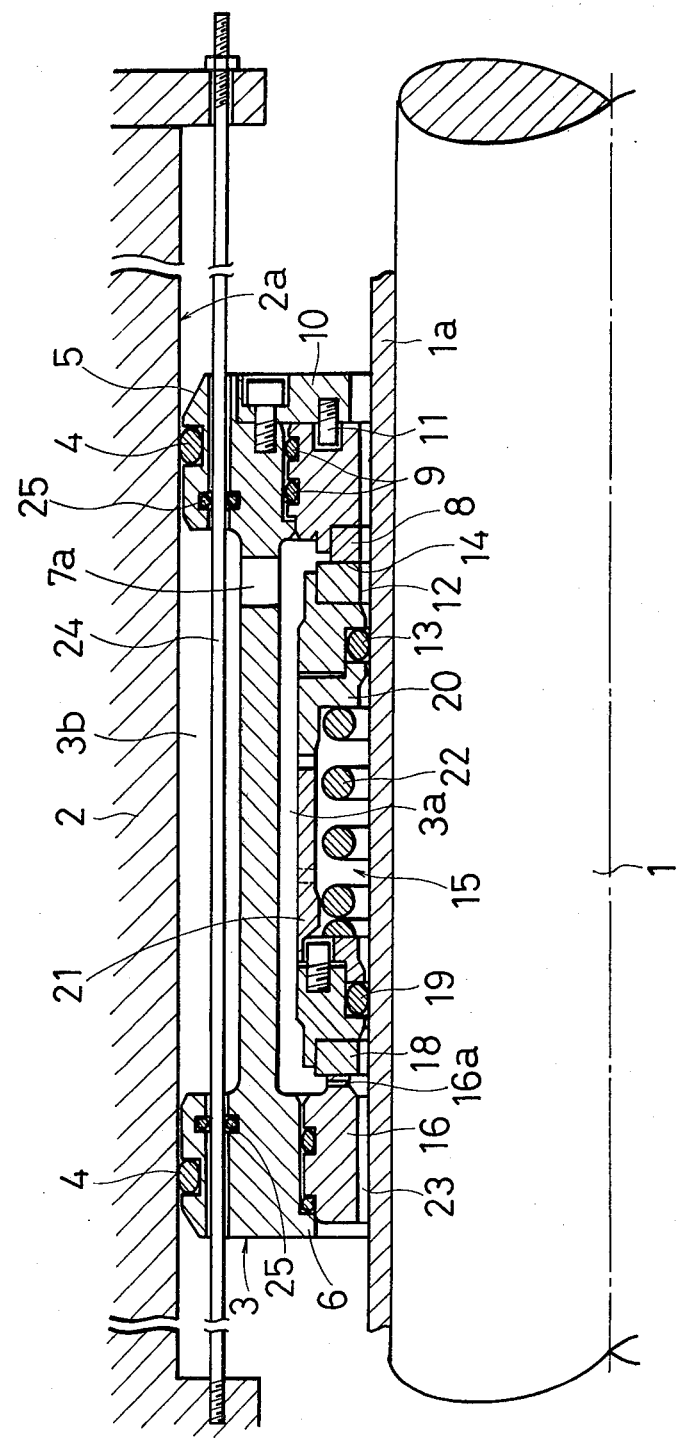
FIG. 3 is a section view of the upper half of a second embodiment of mechanical seal in accordance with the present invention.

As shown in FIG. 3, a guide rod 24 long enough to extend along the axis of the rotary shaft 1 is inserted into the front and rear walls 5 and 6 of the seal unit case 3 through O-rings 25, and is attached to the seal housing 2. With such arrangement, the guide rod 24 can securely prevent the seal unit 3 from being rotated, while permitting its axial movement.

It is to be noted that in FIG. 3 like parts are designated by like numerals used in FIG. 1, and the communicating hole 6a in the rear wall 6 of the seal unit case 3 is omitted in FIG. 3.

Figure 4:
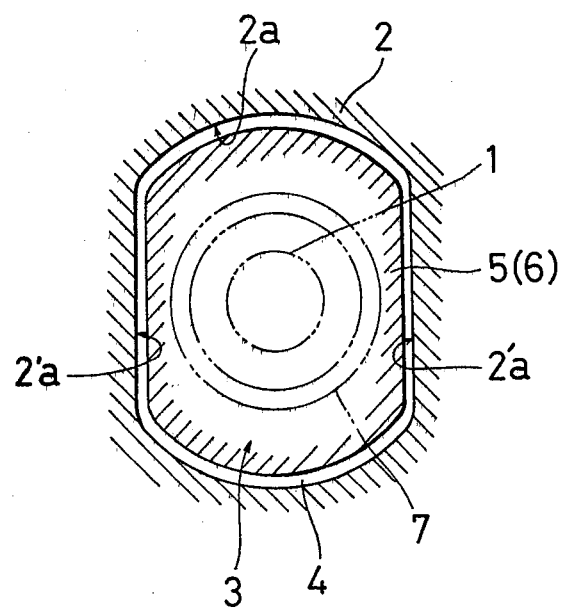
FIG. 4 is a section view of main portions of a third embodiment of the present invention, along the line corresponding to the line IV—IV in FIG. 1.

In the embodiments discussed hereinbefore, the inner periphery 2a of the seal housing 2 and the outer peripheries of the front and rear walls 5 and 6 of the seal unit case 3 have circular sections. As shown in FIG. 4, however, the inner periphery 3a of the seal housing 2 may have a non-circular section including linear portions 2'a, and the outer peripheries of the front and rear walls 5 and 6 may also have non-circular sections corresponding to that of the inner periphery 2a. Such arrangement can securely prevent the seal unit case 3 from being rotated, without the addition of another member such as the guide rod 24. It is a matter of course that, in such construction as shown in FIG. 4, the O-rings 4 are formed in the corresponding shape.

The concept of forming the sections of members fitted into each other, into a non-circular shape, may be applied not only to the portions to be fitted of the seal housing 2 and the seal unit case 3, but also to the portions of the rotary ring 12 and the movable ring 16 which are put on the rotary shaft 1, thereby to securely prevent the rings 12 and 16 from being rotated with respect to the rotary shaft 1.

The present invention may be applied not only to the shaft sealing means of a turbodrill, but also be devices of every kind required to intercept one or more fluids of which pressure difference might undergo a change due to variations of the pressures. Moreover, the present invention may be conveniently applied as a shaft sealing means for a reciprocating shaft such as a plunger pump, i.e., a device in which the shaft is moved with respect to the casing.

What is claimed is:

1. A mechanical shaft seal for intercepting a first fluid and a second fluid, comprising:
    a rotary ring disposed on a rotary shaft in a non-rotatable but axially slidable manner;
    a stationary ring;
    a seal unit case for housing said rotary ring and to which said stationary ring is secured;
    a seal housing, said seal unit case being fitted in airtight fashion to and held by the inner periphery of said seal housing in a non-rotatable manner but being automatically axially displaceable to a position on the shaft at which said first and second fluids are balanced in pressure; and,
    a spring-load retaining mechanism disposed between said seal unit case and said rotary ring for applying spring-load to said rotary ring to maintain contact between said rotary ring and said stationary ring, regardless of the axial displacement of said unit case and the rotation of said rotary ring.

2. The mechanical shaft seal as recited in claim 1, wherein the seal unit case comprises front and rear walls and a cylindrical portion connecting said front wall to said rear wall, said front and rear walls being fitted in airtight fashion to the inner periphery of the seal housing by O-rings in a non-rotatable but axially slidable manner.

3. The mechanical shaft seal as recited in claim 2, wherein the stationary ring is securely fixed to the front wall of the seal unit case, and the rotary ring is housed in the cylindrical portion of the seal unit case.

4. The mechanical shaft seal as recited in claim 3, wherein the spring-load retaining mechanism comprises a fixed ring secured through the rear wall of the unit case; a movable ring opposite to said fixed ring disposed on the rotary shaft in a non-rotatable but axially slidable manner; first and second spring retainers respectively connected to the rotary ring and the movable ring; and, a spring disposed in the first and second spring retainers.

5. The mechanical shaft seal as recited in claim 4, wherein the first and second spring retainers are formed in an identical cylindrical shape, the abutting ends of the spring retainers being formed in a comb shape to be engaged with each other for permitting both said retainers to be axially moved within a predetermined range.

6. The mechanical shaft seal as recited in claim 5, wherein: the fixed ring has therein a communicating hole communicating with the second fluid side and the inside of the cylindrical portion of the seal case; the cylindrical portion of the seal case has therein a communicating hole communicating with the inside of the cylindrical portion and the outside thereof, at a position opposite to the sealing end surfaces of the stationary ring and the rotary ring; and, the seal unit case has in the rear wall a communicating hole communicating with the outside of the cylindrical portion and the second fluid side.

7. The mechanical shaft seal as recited in claim 1, mounted on the rotary shaft of a turbodrill.

8. The mechanical shaft seal as recited in claim 6, further comprising a guide rod passing through the front and rear walls of the seal unit case, said guide rod permitting the seal unit case only to axially moved.

9. The mechanical shaft seal as recited in claim 6, wherein the outer peripheries of the front and rear walls of the seal unit case have non-circular sections including linear portions, and the inner periphery of the seal housing, into which the outer peripheries of the front and rear walls are fitted, has a non-circular section corresponding to those of the outer peripheries of the front and rear walls.

10. The mechanical shaft seal as recited in claim 1, wherein the inner periphery of the rotary ring has a non-circular section including linear portions, and the outer periphery of the rotary shaft, on which the inner periphery of the rotary ring is put, has a non-circular section corresponding to that of the inner periphery of the rotary ring.

11. The mechanical shaft seal as recited in claim 4, wherein the inner periphery of the movable ring has a non-circular section including linear portions, and the outer periphery of the rotary shaft, on which the inner periphery of the movable ring is disposed, has a non-circular section corresponding to that of the inner periphery of the movable ring.

* * * * *

UNITED STATES PATENT AND TRADEMARK OFFICE
CERTIFICATE OF CORRECTION

PATENT NO. : 4,381,867
DATED : 5/3/83
INVENTOR(S) : Ohgoshi

It is certified that error appears in the above-identified patent and that said Letters Patent is hereby corrected as shown below:

Column 3, line 2, between "and" and "are" insert --21--.
Column 4, line 61, delete "3a" and insert --2a--.

Signed and Sealed this

Eighth Day of May 1984

[SEAL]

Attest:

GERALD J. MOSSINGHOFF

Attesting Officer

Commissioner of Patents and Trademarks